US008213295B2

(12) United States Patent
Ginde

(10) Patent No.: US 8,213,295 B2
(45) Date of Patent: Jul. 3, 2012

(54) TRANSACTION TIMEOUT HANDLING IN COMMUNICATION SESSION MANAGEMENT

(75) Inventor: Samir Vijay Ginde, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 11/853,605

(22) Filed: Sep. 11, 2007

(65) Prior Publication Data

US 2008/0062863 A1 Mar. 13, 2008

Related U.S. Application Data

(60) Provisional application No. 60/825,307, filed on Sep. 12, 2006.

(51) Int. Cl.
*H04L 1/00* (2006.01)
*H04L 12/50* (2006.01)
*H04L 12/28* (2006.01)
*H04J 1/02* (2006.01)
(52) U.S. Cl. .......................................... 370/216
(58) Field of Classification Search .................. None
See application file for complete search history.

(56) References Cited

U.S. PATENT DOCUMENTS

| 5,936,943 | A | 8/1999 | Sakagami et al. | |
|---|---|---|---|---|
| 6,965,599 | B1* | 11/2005 | Sakurai et al. | 370/392 |
| 6,992,974 | B1* | 1/2006 | Tripathi | 370/216 |
| 2003/0187975 | A1* | 10/2003 | Brown et al. | 709/224 |
| 2003/0210649 | A1* | 11/2003 | Bondi | 370/229 |
| 2004/0047301 | A1* | 3/2004 | Poikselka et al. | 370/261 |
| 2004/0148395 | A1* | 7/2004 | Schulzrinne | 709/227 |
| 2005/0136926 | A1* | 6/2005 | Tammi et al. | 455/435.1 |
| 2005/0172032 | A1* | 8/2005 | Pessi | 709/246 |
| 2005/0223228 | A1* | 10/2005 | Ogawa et al. | 713/168 |
| 2005/0240674 | A1* | 10/2005 | Depalma et al. | 709/230 |
| 2006/0256785 | A1* | 11/2006 | Nagai et al. | 370/389 |

(Continued)

FOREIGN PATENT DOCUMENTS

JP 9205438 A 8/1997

(Continued)

OTHER PUBLICATIONS

Price et al., "Signaling Compression (SigComp); RFC 3320.txt" IETF Standard, Internet Engineering Task Force, IETF, CH, Jan. 1, 2003, pp. 1-63, XP015009190.*

(Continued)

*Primary Examiner* — Chirag Shah
*Assistant Examiner* — Jenkey Van
(74) *Attorney, Agent, or Firm* — Kenyon S. Jenckes; Ashish L. Patel

(57) ABSTRACT

This disclosure describes techniques for handling transaction timeouts during setup and management of communication sessions. In particular, a communication device may be configured to handle transaction timeouts differently based on the type of signaling and control message that experienced the transaction timeout. In one aspect, the communication devices may handle transaction timeouts experienced during register transactions differently than transaction timeouts experienced during non-register. For example, the communication device that initiated the transaction initiates at least one subsequent transaction to the current proxy server when a non-register transaction experiences the transaction timeout. After experiencing a threshold number of consecutive transaction timeouts, an expiration of a failure duration timer, or a transaction timeout associated with a register transaction, the communication device cancels the current communication session and sends a register message to a new proxy server.

56 Claims, 5 Drawing Sheets

U.S. PATENT DOCUMENTS

| | | | |
|---|---|---|---|
| 2006/0270418 A1* | 11/2006 | Hannu et al. | 455/455 |
| 2006/0291400 A1* | 12/2006 | Balasaygun et al. | 370/242 |

FOREIGN PATENT DOCUMENTS

| | | |
|---|---|---|
| JP | 2000349856 A | 12/2000 |
| JP | 2003515969 A | 5/2003 |
| JP | 2004179764 A | 6/2004 |
| JP | 2006180275 A | 7/2006 |
| JP | 2006237950 A | 9/2006 |
| WO | WO2006077734 A1 | 7/2006 |

OTHER PUBLICATIONS

Rosenberg J et al:RFAC 3261: "SIP: Session Initiation Protocol" 20020601; 20020600, Jun. 1, 2002, pp. 1-270, XP015009039.

Donovan J Rosenberg Cisco Systems S: "Session Timers in the Session Initiation Protocol(SIP); RFC4028. TXT" IETF Standard, Internet Engineering Task Force, IETF, CH Apr. 1, 2005, pp. 1-27, XP015041971.

3GPP: TS29.228 V7.2.0: IP Multimedia Subsystem Cx and Dx Interfaces [Online] Jun. 2006, pp. 1-57, XP002485393.

Price Siemens/Roke Manor C Bormann TZI/UNI Breman J Christoffersson H Hannu Ericsson Z Liu Nokia J Rosenberg Dynamicsoft R: "Signaling Compression (SigComp); RFC3320. txt" IETF Standard, Internet Engineering Task Force, IETF, CH, Jan. 1, 2003, pp. 1-63, XP015009190.

International Search Report—PCT/US2007/078320, International Search Authority—European Patent Office—Jul. 7, 2008.

Written Opinion—PCT/US2007/078320, International Search Authrotiy—Eruopean Patent Office—Jul. 7, 2008.

IEEE Transactions on Computers, vol. 51, No. 10, Vijay Kumar et al., 2002, TCOT-A Timeout-Based Mobile Transaction Commitment Protocol.

* cited by examiner

TRANSACTION TIMEOUT HANDLING IN COMMUNICATION SESSION MANAGEMENT

This application claims the benefit of U.S. Provisional Application No. 60/825,307, filed on Sep. 12, 2006, the entire content of which is incorporated herein by reference.

TECHNICAL FIELD

This disclosure relates to establishment of communication sessions between communication devices.

BACKGROUND

Signaling and control protocols are used for establishing and managing communication sessions between devices. In particular, these signaling and control protocols provide several functions for the setup, modification and termination of the communication sessions. Some signaling and control protocols are based on an HTTP-like request and response transaction model. Each transaction consists of a request that invokes a particular function and at least one response. When no response is received for the request within a particular period of time, the transaction is considered to have experienced a timeout.

One such signaling and control protocol, the Session Initiation Protocol (SIP), is an application layer signaling and control protocol for establishing and managing delivery of Internet Protocol (IP)-based telephony services in a packet-based network. SIP can be used to support a variety of telecommunication services such as audio or video conferencing, text messaging, interactive gaming and call forwarding. The SIP protocol is described in Request for Comment (RFC) 3261, published in 2002, and prepared by the Internet Engineering Task Force (IETF). SIP is compatible with other protocols to build a multimedia architecture that can provide complete IP-based telephony services to end users. For example, SIP can operate over any transport layer protocol, such as User Datagram Protocol (UDP) or Transmission Control Protocol (TCP).

SUMMARY

In one aspect, a method comprises detecting a transaction timeout for a non-register signaling and control transaction upon not receiving a reply message from a first device, initiating at least one subsequent signaling and control transaction with the first device for a particular period of time after detecting the transaction timeout for the non-register transaction, and initiating a register signaling and control transaction with a second device after the particular period of time when no reply message is received for the at least one subsequent signaling and control transaction.

In another aspect, an apparatus comprises transmit circuitry to transmit signals and a transaction management module that detects a transaction timeout for a non-register signaling and control transaction upon not receiving a reply message from a first device. The transaction management module initiates, via the transmit circuitry, at least one subsequent signaling and control transaction with the first device for a particular period of time after detecting the transaction timeout for the non-register signaling and control transaction and initiates, via the transmit circuitry, a register signaling and control transaction with a second device after the particular period of time when no reply message is received for the at least one subsequent signaling and control transaction.

In another aspect, a computer-program product comprising a computer readable medium having instructions thereon, the instructions comprising code for detecting a transaction timeout for a non-register signaling and control transaction upon not receiving a reply message from a first device, code for initiating at least one subsequent signaling and control transaction with the first device for a particular period of time after detecting the transaction timeout for the non-register transaction, and code for initiating a register signaling and control transaction with a second device after the particular period of time when no reply message is received for the at least one subsequent signaling and control transaction.

In another embodiment, an apparatus comprises means for detecting a transaction timeout for a non-register signaling and control transaction upon not receiving a reply message from a first device and means for initiating at least one subsequent signaling and control transaction with the first device for a particular period of time after detecting the transaction timeout for the non-register signaling and control transaction, wherein the initiating means initiates a register signaling and control transaction with a second device after the particular period of time when no reply message is received for the at least one subsequent signaling and control transaction.

The techniques described in this disclosure may be implemented in a communication apparatus in hardware, software, firmware, or any combination thereof. If implemented in software, the software may be executed in a computer. The software may be initially stored as instructions, program code, or the like. Accordingly, the disclosure also contemplates a computer program product for establishment and management of communication sessions comprising a computer-readable medium, wherein the computer-readable medium comprises codes for causing a computer to execute techniques and functions in accordance with this disclosure.

The details of one or more examples of the techniques of this disclosure are set forth in the accompanying drawings and the description below. Other features, objects, and advantages of this disclosure will be apparent from the description and drawings, and from the claims.

DETAILED DESCRIPTION

Figure 1:
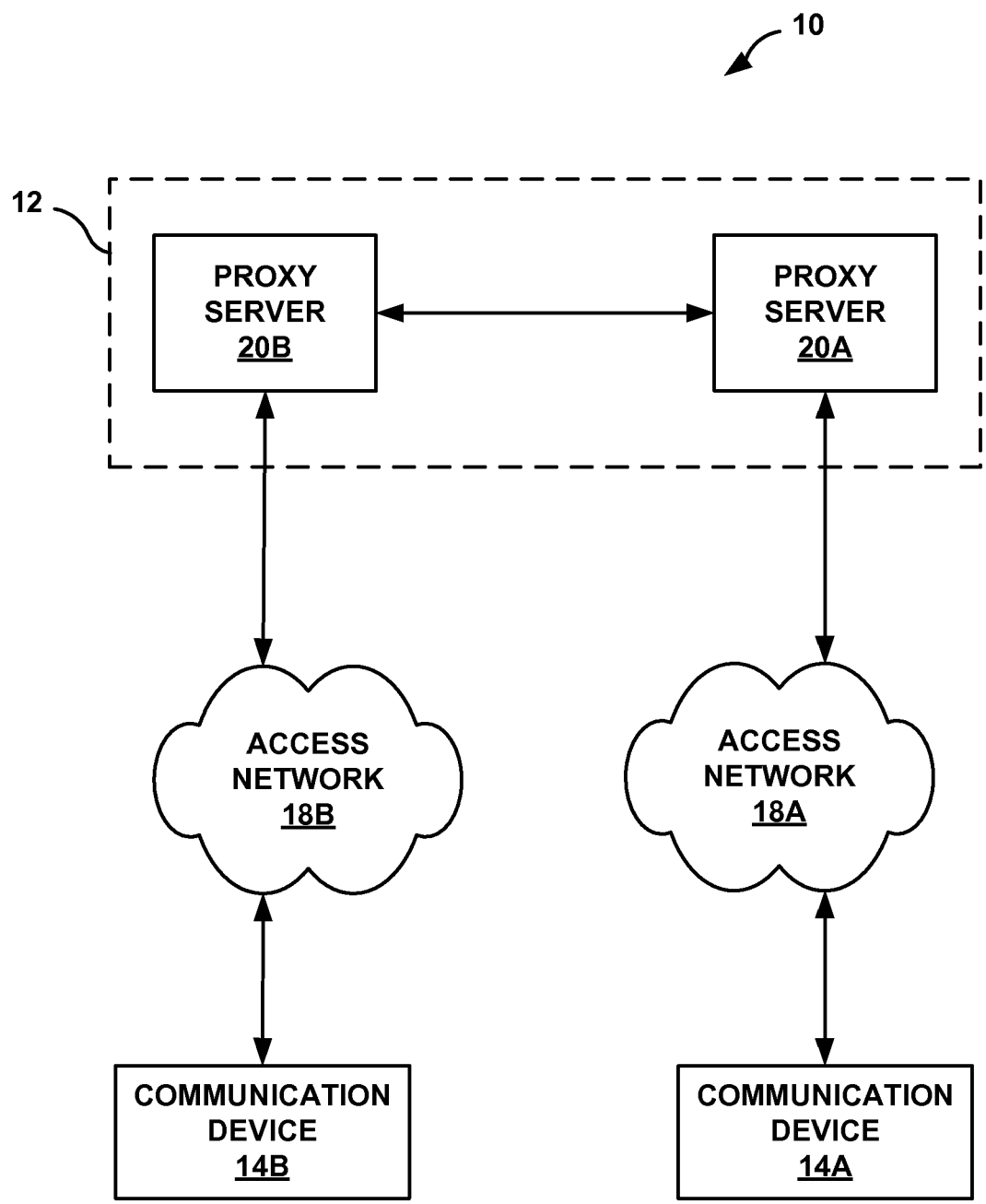
FIG. 1 is a block diagram illustrating a system for management of communication sessions between two or more communication devices using a signaling and control protocol.

In general, this disclosure relates to establishment of communication sessions between communication devices. For example, communication devices may use a signaling and control protocol for establishing and managing communication sessions between the devices. Some signaling and control protocols, such as Session Initiation Protocol (SIP), are based on an HTTP-like request and response transaction model. As used herein, the term "transaction," refers to an exchange of messages. In particular, each transaction consists of at least two messages: a first message which is sent from a first one of the communication devices to the second communication device (or proxy server) and a second message that is received from the second communication device (or proxy server) in reply to the first message. As an example, a transaction may consist of a request message that invokes a particular session management function and at least one response message. In some cases, the transaction may also include at least one acknowledgement message. In either case, when no reply is received for the first message of the transaction within a particular time period, the transaction is considered to have experienced a timeout. The term transaction can be used interchangeably with "call control transaction," "signaling transaction," "call setup transaction," or the like.

This disclosure describes techniques for avoiding and recovering from transaction timeouts during setup and management of communication sessions. In particular, the communication devices handle transaction timeouts differently based on the type of signaling and control message that experienced the transaction timeout. In one aspect, the communication devices may handle transaction timeouts experienced during register transactions differently than transaction timeouts experienced during non-register transactions. A "register transaction" may refer to the exchange of messages that request addition or removal of a location for sending data to the originating device. In the SIP protocol, for example, messages of a register transaction may include initial REGISTER messages, re-REGISTER messages and de-REGISTER messages. A "non-register transaction" refers to a transaction that is not a register transaction. In the SIP protocol, examples of messages of a non-register transaction include SUBSCRIBE messages, INVITE messages, CANCEL messages, PRACK messages, UPDATE messages, BYE messages, ACK messages and the like.

In accordance with the techniques of this disclosure, the communication device that initiated the transaction, referred to herein as the client device or the originating device, may attempt to send at least one subsequent message when the transaction that experienced the transaction timeout is a non-register transaction. The originating device may, for example, continue to send subsequent messages until experiencing a threshold number of consecutive transaction timeouts, expiration of a timer or a transaction timeout associated with a register message. After experiencing a threshold number of consecutive transaction timeouts, expiration of the timer or a transaction timeout associated with a register message, the originating device cancels the current communication session and may send a register message to a new proxy server. Being able to send one or more subsequent messages after a transaction timeout experienced by a non-register transaction may enable the communication device to avoid unnecessary disruption to ongoing communication sessions when the cause of the transaction timeout is temporary.

FIG. 1 is a block diagram illustrating a system 10 for management of communication sessions between two or more communication devices using a signaling and control protocol. In the example shown in FIG. 1, system 10 includes communication devices 14A and 14B (collectively, "communication devices 14"). System 10 also includes a signaling network, such as SIP network 12, that is embedded in or otherwise coupled to a packet-based communication network, such as an Internet Protocol (IP) network (not shown). In the example of FIG. 1, communication devices 14 communicate with one another using a SIP communication session administered by SIP network 12. In many cases, communication devices 14 may communicate with more than one other communication device. For ease of illustration, however, FIG. 1 depicts communication between only two communication devices 14.

Communication devices 14 may be any devices incorporating wired or wireless communication capabilities. For example, one or both of communication devices 14 may be a cellular telephone, a satellite telephone, a radio telephone, a personal digital assistant (PDA), a so-called SIP phone, a soft phone, a WiFi handset, an IP phone or any other device incorporating wireless communication capabilities. Alternatively, one or both of communication devices 14 may be a desktop computer, a laptop computer, a fixed telephone, a media gateway, an application server or any other device incorporating wired communication capabilities. In this disclosure, communication devices 14 are described as being configured to support the SIP signaling protocol for one or more of a variety of applications, such as Voice-over-Internet-Protocol (VoIP) telephony and audio conferencing, telephony and video conferencing, text messaging, online gaming, and other packet-based telephony applications. The techniques described herein may be extended, however, for use with other signaling protocols such as the H.323 standard introduced by the International Telecommunication Union Telecommunication Standardization Sector (ITU-T).

Communication devices 14 are coupled to SIP network 12 via access networks 18A and 18B, respectively (collectively "access networks 18"). In particular, communication device 14A is coupled to SIP network 12 via access network 18A and communication device 14B is coupled to SIP network 12 via access network 18B. Access networks 18A and 18B may be wired networks, wireless networks or a combination thereof In the wireless context, communication devices 14 communicate via access networks 18 according to any of a variety of wireless radio access technologies (RATs) such as General Packet Radio Service (GPRS), Code Division Multiple Access (CDMA), CDMA 2000, Wideband-CDMA (W-CDMA), 1x Evolution-Data Optimized (1xEV-DO) or the like.

Communication devices 14 may communicate via access networks 18 using the same access technology or using different access technologies. Alternatively, or additionally, communication devices 14 may be equipped to communicate according to a wireless local area network (WLAN) protocol such as any of the protocols defined by the various IEEE 802.11 standards. Access networks 18 may include wireless base stations and access points that exchange wireless signals with communication devices 14, and provide a connection to other network clients or servers via a global packet-based core network such as the Internet, a wide area network (WAN), or a local area network (LAN), and/or the public switched telephone network (PSTN).

SIP network 12 includes proxy servers 20A and 20B (collectively, "proxy servers 20") that act on behalf of communication devices 14 to facilitate the establishment of a communication session by exchanging signaling messages, such as one or more SIP messages. Communication devices 14 and proxy servers 20 exchange SIP messages to setup and manage one or more communication sessions between communication devices 14. Upon establishment of a SIP session, multimedia content such as audio, video or both may be exchanged between communication devices 14 in accordance with a media transport protocol such as real-time transport protocol (RTP).

When a user of an originating device, e.g., communication device 14A, interacts with an application executing on the device that requires a communication session to be established, the originating device communicates with proxy servers 20 to facilitate the establishment of the communication session between the originating device and a terminating device, e.g., communication device 14B. The phrase "originating device" as used in this disclosure, refers to the one of communication devices 14 that initiates the attempt to establish the session, e.g., make a call. The phrase "terminating device" as used in this disclosure, refers to the one of communication devices 14 with which the originating device is attempting to establish the communication session. For exemplary purposes, communication device 14A is described as the originating device and communication device 14B is described as the terminating device. However, either of the devices may function as the originating device or the terminating device in a particular session. In other words, either the originating or the terminating device in a session may initiate transactions while the session is in progress. In addition, as mentioned above, the originating device may communicate with multiple terminating devices in some cases.

Communication devices 14 and proxy servers 20 may exchange a number of SIP messages to setup and manage the communication session. In the case of audio telephony, for example, communication devices 14 and proxy servers 20 may exchange a number of SIP messages to establish a VoIP session. The establishment of the communication session involves one or more transactions. In particular, communication device 14A may send messages, e.g., SIP requests or responses, to proxy server 20A. Proxy server 20A processes the messages and ultimately routes the messages to proxy server 20B associated with communication device 14B. Proxy server 20B routes the messages to communication device 14B. Communication device 14A may participate in a plurality of transactions at the same time for different applications executing on communication device 14A.

For each of the transactions initiated by communication device 14A, communication device 14A waits for a reply. Communication device 14A may, for example, wait for a response message in reply to each of the sent request messages. As another example, communication device 14A may wait for an acknowledgement message in reply to each of the sent responses. If no reply is received, communication device 14A may retransmit the message in accordance with a retransmission schedule. Communication device 14A may continue to retransmit the message in accordance with the retransmission schedule until a reply is received for the message or a transaction timeout occurs. As used herein, the term "transaction timeout" refers to the situation in which no reply is received within a particular period of time measured from when the first message in the sequence is transmitted.

A SIP transaction may experience a timeout due to any of a number of causes. The SIP transaction may, for example, experience a timeout due to network packet losses caused by a radio frequency (RF) outage on the air-interface or heavy traffic congestion on the IP core network. As another example, the SIP transaction may also experience a timeout when an IP security (Ipsec) error occurs, such as a failure of an integrity check. Other causes of the SIP transaction timeouts include decompression failure at proxy servers 20 or unreachable proxy servers 20.

The cause of the transaction timeout may vary in length depending on the type of cause. More specifically, some causes of transaction timeouts may only be temporary, such as a temporary RF outage or traffic congestion. Other transaction timeouts may be due to causes that are more permanent, e.g., in the case of an unreachable proxy server 20. Thus, handling all causes of transaction timeouts in the same manner sometimes results in unnecessary disruption to ongoing communication sessions. This disclosure provides techniques for handling transaction timeouts in management of communication sessions. The techniques may reduce unnecessary disruption to ongoing communication sessions when the timeout is caused by temporary conditions. Moreover, the techniques may attempt to avoid transaction timeouts all together.

In particular, communication devices 14 handle transaction timeouts differently based on the type of signaling and control transaction that experienced the transaction timeout. In one aspect, the communication devices 14 may handle transaction timeouts experienced during register transactions differently than transaction timeouts experienced during non-register transactions. As described above, "register transactions" refer to exchanges of messages that update a location server with location information for the communication device sending the register message. The register message may, for example, include a Uniform Resource Identifier (URI) for communication device 14A and/or an IP address of communication device 14A. In the SIP protocol, register messages may include initial REGISTER messages, re-REGISTER messages and de-REGISTER messages. More specifically, initial registration messages are used by a SIP communication device to bind the contact address of the device to its registered address of record, when no such binding existed previously. A re-registration messages refreshes the lifetime of the communication device's binding. A de-registration messages removes a binding. "Non-register transactions" refer to exchanges of messages that are not register messages. In the SIP protocol, for example, non-register messages may include SUBSCRIBE messages, INVITE messages, CANCEL messages, PRACK messages, UPDATE messages, BYE messages, ACK messages and the like. These non-register messages are mostly used to create, maintain and terminate the communication session between communication devices 14. Other non-register messages may be used to obtain information about certain events in the network. The above examples are specific to the SIP protocol. The techniques of this disclosure are also, by extension, applicable to other signaling and control protocols.

In accordance with the techniques of this disclosure, the communication device that initiated the transaction, i.e., communication device 14A in this example, may initiate at least one subsequent transaction to the current proxy server 20A when the previous transaction that experienced the transaction timeout is a non-register transaction. Communication device 14A may continue to initiate subsequent transactions by sending the one or more messages to proxy server 20A for a particular period of time after the transaction timeout. Communication device 14A may, for example, continue to initiate subsequent transactions with proxy server 20A until experiencing a threshold number of consecutive transaction timeouts. Alternatively, communication device 14A may continue to initiate subsequent transactions with proxy server 20A until expiration of a failure duration timer that begins upon experiencing the first transaction timeout. Communication device 14A may also continue to initiate subsequent transactions with proxy server 20A until experiencing a transaction timeout associated with a register transaction.

In some cases, the threshold number of consecutive transaction timeouts or the threshold duration of time that starts when a transaction timeout occurs may vary based on the cause of the transaction failure or type of transaction. In other words, the duration of the failure duration timer and/or the threshold number of consecutive transaction timeouts may be adjusted to be reached more quickly in certain instances, thus reducing the number of incoming calls that may be lost during subsequent attempted transactions. The duration of failure duration timer and/or the threshold number of consecutive transaction timeouts may, for example, be preconfigured or dynamically selected based on call arrival statistics. Call arrival statistics refer to the rate at which SIP requests are expected to arrive. The majority of SIP requests may be anticipated to establish a telephony session, or deliver an instant message. It is possible that the cause of transaction timeout also affects messages sent to the communication device. This means that until the threshold number of transaction timeouts occur, incoming sessions could be rendered undeliverable. The maximum tolerable number of undeliverable incoming sessions divided by the average rate at which incoming sessions are known to arrive, yields the duration of time for which blocking may be acceptable. Transactions initiated within this duration of time may continue to experience timeouts. Unlike incoming missed sessions, failed outgoing sessions are immediately perceptible to the user of a communication device. The threshold for transaction timeouts represents the acceptable number of such failed sessions. In some cases, the duration of time can be preconfigured based on call arrival rate statistics.

After transactions continue to timeout for the particular period of time, e.g., experiencing a threshold number of consecutive transaction timeouts, expiration of the failure duration timer, or experiencing a transaction timeout associated with a register message, communication device 14A cancels the current communication sessions and initiates a register transaction with a new proxy server. Being able to send one or more subsequent messages after a transaction timeout experienced by a non-register transaction may enable communication device 14A to avoid unnecessary disruption to ongoing communication sessions when the cause of the transaction timeout is only temporary, in contrast to permanent, prolonged or persistent.

In the example of FIG. 1, system 10 includes two proxy servers 20 and two endpoint communication devices 14. However, a signaling and control protocol infrastructure may include any number of proxy servers and endpoint communication devices. Moreover, system 10 may include additional elements not illustrated in FIG. 1, such as one or more registrar servers and location servers. The techniques for handling transaction timeouts described in this disclosure may be executed by communication devices that use a request-response pattern, and are particularly relevant for devices that operate over lossy communications media. Accordingly, SIP network 12 as shown in FIG. 1 is merely exemplary and should not be considered limiting of the techniques as broadly described in this disclosure. Thus, the techniques of this disclosure are equally applicable to similar signaling and control protocols.

Figure 2:
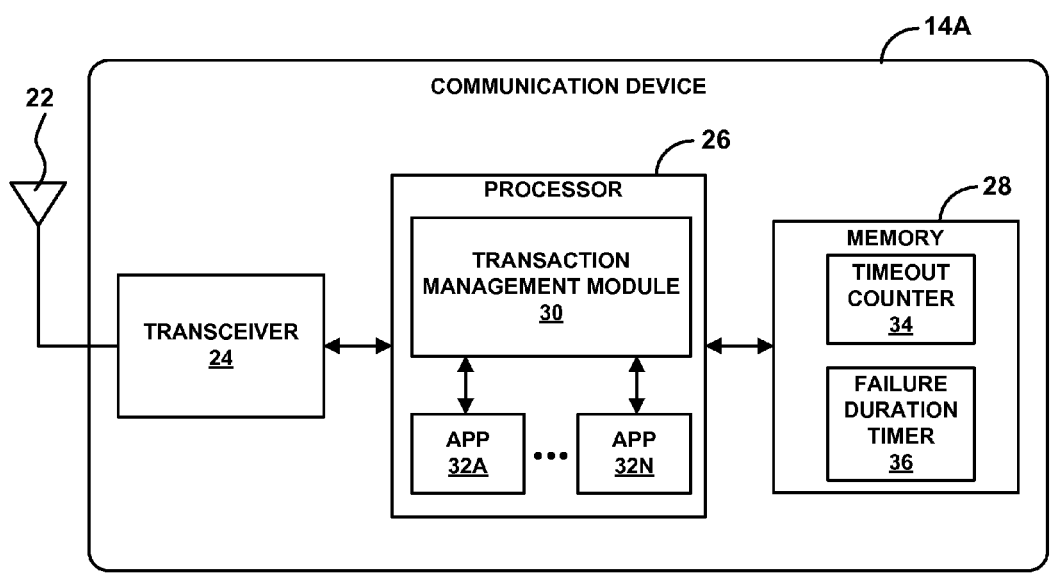
FIG. 2 is a block diagram illustrating one of the communication devices of FIG. 1 in further detail.

FIG. 2 is a block diagram illustrating communication device 14A of FIG. 1 in further detail. Communication device 14B of FIG. 1 may include similar components as those illustrated in communication device 14A of FIG. 2. Communication device 14A includes an antenna 22, a transceiver 24, a processor 26 and a memory 28. Transceiver 24 includes transmit and receive circuitry (not shown) that transmits and receives signals. In the example illustrated in FIG. 2, transceiver transmits and receivers signals via antenna 22. Transceiver 24 may include appropriate analog and/or digital circuit components such as, for example, amplifiers, filters, frequency converters, modulators, demodulators, analog-to-digital conversion circuitry, digital-to-analog conversion circuitry and digital modem circuitry. In operation, antenna 22 transmits and receives wireless signals on radio frequency bands supported by communication device 14A. Transceiver 24 may be configured to support any desired radio access technology (RAT) or any WLAN protocol, such as the protocols specified in this disclosure. In some cases, however, transmit and receive circuitry may be formed by separate transmitter and receiver components. Although the example communication device illustrated in FIG. 2 is a wireless communication device, the techniques are equally applicable to wired communication devices.

Processor 26 controls transceiver 24 to transmit signals and processes signals received by transceiver 24. Processor 26 is responsible for management of communication sessions for application modules 32A-32N (collectively, "application modules 32"). In particular, transaction management module 30 and application 32 set up, modify and terminate the communication sessions. Application modules 32 (each of which are labeled "APP" in FIG. 2) are applications executing on processor 26 that use communication sessions established using a signaling and control protocol, such as SIP. Application modules 32 interact with a user, e.g., via a user interface such as a telephone keypad. Application modules 32 generate signaling and control messages in response to the input from the user to initiate a transaction. For example, if the user is trying to make a VoIP telephony call, the VoIP telephony application may generate an INVITE transaction. Application modules 32 may be SIP-based application modules, such as one or more of a VoIP audio telephony and conferencing application, video telephony and conferencing application, text messaging application, instant messaging application, online gaming application, presence application, videosharing application, push-to-talk application and/or other packet-based telephony application.

Transaction management module 30 may manage the transactions for application modules 32. In other words, transaction management module 30 may implement the transaction layer of the signaling and control protocol. Transaction management module 30 monitors for transaction timeouts and handles the transaction timeouts in accordance with the techniques of this disclosure. Because SIP operates on a request/response transaction model, transaction management module 30 waits for a reply, e.g., a response message or acknowledgement message, in each of the transactions. If no reply is received, transaction management module 30 and/or applications 32 may retransmit the message in accordance with a retransmission schedule. In some aspects, the retransmission schedule may vary based on the type of message. Table 1 below illustrates exemplary retransmission schedules for several different types of SIP request messages for UDP transport.

TABLE 1

| SIP Request retransmission schedule for UDP (assuming T1 = 0.5 seconds) | | | |
|---|---|---|---|
| Request name | Transaction timeout timer | Number of transmissions before time out | Retransmission schedule relative to original transmission (seconds) |
| INVITE | 64 * T1 | 7 | 0, 0.5, 1.5, 3.5, 7.5, 15.5, 31.5 |

TABLE 1-continued

SIP Request retransmission schedule for UDP
(assuming T1 = 0.5 seconds)

| Request name | Transaction timeout timer | Number of transmissions before time out | Retransmission schedule relative to original transmission (seconds) |
|---|---|---|---|
| non-INVITE | 64 * T1 | 11 | 0, 0.5, 1.5, 3.5, 7.5, 11.5, 15.5, 19.5, 23.5, 27.5, 31.5 |
| ACK | 64 * T1 after 2xx response or 32 sec after 3xx-6xx response | 11 | depends on when response retransmissions are received |

Table 1 illustrates the amount of time until a transaction timeout is experienced, referred to herein as a transaction timeout timer, for three types of requests; an INVITE message, a non-INVITE message (except for an ACK) and an ACK. For an INVITE message, a non-INVITE message (except for an ACK message) and an ACK message sent for 2xx response messages, the transaction timeout timer is 64*T1. T1 is an estimate of the round-trip time (RTT), and for the SIP protocol T1 has a default value of 500 milliseconds. For ACK messages sent in acknowledgement of 3xx-6xx response messages, the transaction timeout timer is thirty-two seconds in accordance with the SIP protocol. Although the example transaction timeout timers are a function of T1, other signaling and control protocols may set particular transaction timeout timers (e.g., as a function of other variables).

When no reply is received, transaction management module 30 and/or applications 32 may retransmit the initial message of the transaction in accordance with the respective retransmission schedule of Table 1. For example, transaction management module 30 retransmits an INVITE message seven times before the INVITE transaction experiences a transaction timeout. An exemplary retransmission schedule for an INVITE transaction is illustrated in the first row of Table 1. In particular, the INVITE message is transmitted at 0.5 seconds (sec), 1.5 sec, 3.5 sec, 7.5 sec, 15.5 sec and 31.5 sec intervals relative to the first transmission request in the case where T1=500 ms unless or until a response is received. The retransmission schedule for a non-INVITE message is illustrated in the second row of Table 1. Transaction management module 30 retransmits the message eleven times before the transaction experiences a timeout. For ACK messages, the retransmission schedule depends on when response messages are received, but a total of eleven retransmissions may be sent before the transaction experiences a timeout.

Table 2 shows similar retransmission schedules for server transactions involving response messages and, in the case of INVITE transactions, associated acknowledgment messages. Like described above for the request messages, communication device 14A retransmits the response messages in accordance with the retransmission schedule until the transaction experiences a timeout or an acknowledgment message is received in reply to the response message. The response for a non-INVITE transaction is retransmitted whenever a retransmission of the request is received.

TABLE 2

SIP Response retransmission schedule (assuming T1 = 0.5 seconds)

| Response/ corresponding request | Transaction timeout timer | Number of transmissions before timeout | Retransmission schedule relative to original transmission (seconds) |
|---|---|---|---|
| reliable 1xx/ INVITE | 64 * T1 | 7 | 0, 0.5, 1.5, 3.5, 7.5, 15.5, 31.5 |
| 2xx/INVITE | 64 * T1 | 11 | 0, 0.5, 1.5, 3.5, 7.5, 11.5, 15.5, 19.5, 23.5, 27.5, 31.5 |
| 3xx-6xx/ INVITE | 64 * T1 | 11 (for UDP only) | 0, 0.5, 1.5, 3.5, 7.5, 11.5, 15.5, 19.5, 23.5, 27.5, 31.5 (for UDP only) |
| 2xx-6xx/non-INVITE | n/a | 11 | Sent when request transmissions are received |

Signaling messages of the transaction may be compressed to reduce signaling latency. The Signaling Compression (SigComp) protocol, as developed by the IETF and described in IETF RFC 3320, establishes an architecture that supports compression and decompression of signaling messages, including SIP messages. Compression removes redundant information from a message while decompression restores the redundant information such that the decompressed message is as similar to the original message as possible. A failure to restore the compressed message to its uncompressed form is termed a decompression failure. Any compression scheme requires the compressor and decompressor to execute compatible compression algorithms. In SigComp, this requirement is fulfilled by mandating the compressor to send a compatible decompression algorithm to the decompressing endpoint. The representation of this algorithm is called "bytecode" in SigComp parlance. Redundancies amongst successive signaling messages often exist and may be exploited to achieve more efficient compression. Whole or parts of previously sent messages constitute state information for compressing subsequent messages. Compressing messages relative to previously saved messages is called dynamic compression. Compression relative to static state items is also possible. Such items are often dictionaries of common keywords found in signaling messages. The statements in this disclosure regarding compression imply the use of the SigComp protocol, but can easily be applied to other mechanisms for performing lossless compression of signaling messages.

Transaction management module 30 and/or applications 32 may apply different compression techniques to the later retransmissions of a request than those applied to the initial few transmissions, based on the number of transaction timeouts experienced prior to the current transaction. Additionally, transaction management module 30 may used different compression techniques for the initial message and any retransmissions of the message based on the underlying transport layer protocol. In particular, transaction management module 30 may send the initial message and one or more retransmissions of the message compressed using existing dynamic state information when there are no previous transaction timeouts.

If the underlying transport layer protocol is User Datagram Protocol (UDP), transaction management module 30 may send the initial message of the transaction and the first N retransmissions of the message compressed using existing dynamic state information. If no reply is received for the initial message or the first N retransmissions, transaction management module 30 may send the remaining retransmissions of the message using a different compression technique, or even uncompressed. For example, transaction management module 30 may send the remaining retransmissions of the message compressed without using dynamic state information. Compressing the data without using state information reduces the likelihood of decompression failure at the terminating device, e.g., communication device 14B in the example described above. For example, if the terminating device has lost the state information, it will not be able to successfully decompress the messages that are compressed using state information. Thus, sending the retransmissions of the message compressed without using state information increases the likelihood of receiving a reply to the messages. If bytecode was included in the earlier transmissions, transaction management module 30 may continue to include bytecode in the retransmissions. When the size of the message exceeds a threshold, e.g., 1300 bytes, transaction management module 30 may open a Transmission Control Protocol (TCP) connection between communication device and proxy to send the remaining retransmissions.

If the underlying protocol is TCP, however, transaction management module 30 sends all transmissions compressed using existing dynamic state information. In other words, the compression technique remains the same during the entire retransmission schedule. This is because TCP performs retransmission automatically in accordance with the protocol and thus does not permit adjusting compression techniques during retransmissions.

When one or more previous transaction timeouts have been experienced, transaction management module 30 sends the initial message and any necessary retransmissions of the message compressed with bytecode without using dynamic state information. Again, this is to reduce the likelihood of decompression failure at the terminating device. Transaction management module 30 may send the initial message and all retransmissions using a single compression technique regardless of the underlying transport layer protocol. If the underlying transport layer protocol is TCP, transaction management module 30 may open a new TCP connection prior to sending the initial message and any necessary retransmissions. Transaction management module 30 may, in some cases, open the new TCP connection using the same port number. Although the retransmission techniques are described as being controlled by transaction management module 30, the retransmissions may be controlled by applications 32 or applications 32 in conjunction with transaction management module 30.

In some aspects, transaction management module 30 may include a mechanism for detecting decompression failure as well as the cause of decompression failure. In these cases, transaction management module 30 may modify the compression technique used to for retransmission of subsequent versions of the message based on the cause of the decompression failure. For example, some protocols, such as the SigComp protocol, have mechanisms for detecting decompression failure. Typically, a decompression failure should be detected immediately after the first transmission of a message. If the message was being transmitted over UDP transport, and the cause of decompression failure determined, the next transmission of the request may use a modified compression technique that avoids the cause of failure. For TCP, the current TCP connection can be closed and a new TCP connection opened to reattempt sending the same request with appropriate modifications.

For example, IETF RFC 4077 defines a simple Negative Acknowledgement (NACK) mechanism for SigComp which allows the recipient to communicate to the sender that a failure has occurred. This NACK contains a reason code that communicates the nature of the failure. For certain types of failures, the NACK will also contain additional details that might be useful in recovering from the failure. A common failure occurs when an access attempt is made on a state that has been deleted at the decompressing endpoint. A SigComp NACK message containing a STATE_NOT_FOUND reason code and the state identifier can result in a subsequent transmission that does not attempt to access the missing state. Other reason codes that reveal an irreversible flaw in the compression scheme may result in a switch to uncompressed operation.

In other aspects, transaction management module 30 may use Internet Control Message Protocol (ICMP) error messages, as proposed in IETF RFC 3263 to detect causes of transaction timeouts. For example, if transaction management module 30 receives a fatal ICMP error message, such as the Destination Unreachable message with relevant code field, it may abort further retransmissions of the message, if using UDP transport, and treat the receipt of this error message like a transaction timeout of a register request. The same behavior applies to a TCP connection failure.

When a response indicating the receipt of the request is received within the allotted time period, e.g., 64*T1 in most of the cases illustrated in Tables 1 and 2, transaction management module 30 sets a timeout counter 34 equal to zero. Additionally, transaction management module 30 may also reset a failure duration timer 36. The received response indicates that proxy server 20A is reachable. Moreover, transaction management module 30 enables dynamic compression if it was previously disabled. Transaction management module 30 may, for example, disable dynamic compression when a transaction timeout occurs for a sent message, as described below.

When no reply is received to the initial message or the retransmissions of the message for the duration of the transaction timeout timer, the transaction experiences a transaction timeout. As described above, transaction management module 30 handles transaction timeouts differently based on the type of signaling and control transaction that experienced the transaction timeout. In one aspect, transaction management module 30 handles transaction timeouts experienced for register transactions differently than transaction timeouts for non-register transactions.

If the transaction that experienced the transaction timeout is a register transaction, transaction management module 30 initiates a new register transaction with a different proxy server. In particular, transaction management module 30 drops current communication sessions and notifies the applications 32 that correspond to such sessions. Applications 32 release current resources and drop dialogs using the cancelled communication session upon getting the notification from transaction management module 30. One of applications 32 in conjunction with transaction management module 30 select a new proxy server 20 and perform initial registration with the new proxy server 20. As described above, register messages include initial registration messages, re-registration messages, and de-registration messages. If the transaction that experienced the transaction timeout included a de-registration message, transaction management module 30 may additionally initiate a de-register procedure to de-register communication device 14A.

If the transaction that experienced the transaction timeout is a non-register transaction, transaction management module 30 typically notifies the one of applications 32 associated with the transaction. Thus, handling of the specific transaction timeout is left for applications 32. Table 3 provides details of exemplary handling of specific request transaction timeouts by transaction management module 30 and applications 32. The handling of the specific transaction timeouts may vary based on the type of request message of the timed-out transaction.

TABLE 3

Transaction management module and Application Handling of SIP Request Transaction Timeouts

| Request | Use Case | Transaction management module handling of transaction timeout | Suggested application handling of transaction timeout |
|---|---|---|---|
| REGISTER | Initial registration, re-registration, de-registration | Drop dialogs (notify applications), use next proxy server address and perform initial registration (by standard) | Release resources and drop dialogs on getting notification from transaction management module |
| SUBSCRIBE | For reg event package, or for other event packages | If not reg event package, inform application. For reg event package, if still registered, periodically attempt SUBSCRIBE (Event: reg) up to a maximum number of attempts or until subscription expires. If this is unsuccessful, or if not registered, try new proxy server. | If not reg event package, on receiving notification from transaction management module, handling is application specific |
| INVITE | For all sessions, session refresh (re-INVITE) | Notify and leave handling to application. | If out of dialog INVITE, application can either retry or release resources, and perform fallback procedures. If mid-dialog, application should terminate and release resources. |
| CANCEL | Within early INVITE dialog | Do nothing, notify and leave handling to application. | Application may send BYE after final response received if cancellation still required. |
| PRACK | Within early INVITE dialog | Do nothing, notify and leave handling to application. | UAS should send 5xx when 1xx times out |
| UPDATE | Within early or confirmed dialog | Do nothing, notify and leave handling to application. | Application may retry or application may allow dialog to continue with old state or may terminate and release resources |
| BYE | Within confirmed dialog | Do nothing, notify and leave handling to application. | RFC 3261 requires session to be terminated. |
| MESSAGE | Instant messaging, out of dialog | Do nothing, notify and leave handling to application. | Application can retry later |
| NOTIFY | Sent within REFER subscription | Do nothing, notify and leave handling to application. | Application should remove subscription |
| PUBLISH | Presence applications | Do nothing, notify and leave handling to application. | Application can retry later |
| REFER | For call transfer type services (VoIP) | Do nothing, notify and leave handling to application | Application may fail call transfer but existing calls should not be terminated if they exist. |
| ACK | All INVITE transactions | Do nothing. Application should handle. | Dialog that have received 2xx are confirmed. All early dialogs should be terminated |
| OPTIONS | Capability exchange | Do nothing, notify and leave handling to application | Application can retry later |
| INFO | Miscellaneous, usually proprietary uses | Do nothing, notify and leave handling to application | Application can retry later |

As illustrated in Table 3, transaction management module 30 typically does nothing in response to the specific transaction timeout experienced by the failed transaction, except to notify the corresponding one of applications 32. Transaction management module 30 generally handles recurring transaction timeouts in a manner to avoid unnecessary disruption of ongoing communication sessions instead of taking action in response to a particular transaction timeout. However, Table 3 illustrates one specific request message for which transaction management module 30 does perform an action, i.e., SUBSCRIBE messages. For SUBSCRIBE messages, transaction management module 30 determines whether the SUBSCRIBE message is part of a "reg" event package. If the SUBSCRIBE message is not part of a "reg" event package, transaction management module 30 does nothing and notifies the corresponding application to handle the timeout transaction. If the SUBSCRIBE message is part of a "reg" event package and communication device 14A is still registered, transaction management module 30 periodically retransmits the SUBSCRIBE message up to a maximum of number of attempts or until the subscription expires. If this is unsuccessful, or if not registered, transaction management module 30 registers with a new proxy server 20. Handling of the transaction timeout experienced by a SUBSCRIBE message may instead be delegated to applications 32 when the event package is not the reg event package. Likewise, handling of transaction timeouts of other request messages may be delegated to transaction management module 30.

Table 4 provides details of exemplary handling of specific server transaction timeouts by transaction management module 30 and applications 32. The handling of the specific transaction timeouts may vary based on the type of response message of the timed-out transaction and type of truncation (INVITE or non-INVITE).

TABLE 4

Transaction management module and Application Handling of SIP Server Transaction Timeouts

| Response | Use Case | Transaction management module handling of transaction timeout | Application handling of transaction timeout |
| --- | --- | --- | --- |
| rel 1xx/INVITE | Sessions | (PRACK not received) Do nothing, notify and leave handling to application. | Reject session with 5xx response |
| 2xx/INVITE | Sessions | (ACK not received) Do nothing, notify and leave handling to application. | RFC 3261 recommends sending BYE to terminate dialog |
| 3xx-6xx/INVITE | Sessions | (ACK not received) Transaction will be destroyed. Inform application. | Application should terminate dialog. |
| 2xx-6xx/non-INVITE | Miscellaneous | (Timer J fires) Transaction will be destroyed. | Applications usually will have honored the request. |

Like for transaction timeouts experienced during client transactions, transaction management module 30 typically does nothing in response to transaction timeouts experienced during a server transaction. Instead, transaction management module notifies the corresponding one of applications 32, and applications 32 handle the specific transaction timeout. As described above, however, at least a portion of the handling of transaction timeouts for response transactions may be delegated from applications 32 to transaction management module 30.

Regardless of the handling of the current transaction timeout by transaction management module 30 and/or applications 32, transaction management module 30 may continue to attempt to initiate subsequent transactions with proxy server 20A for a particular period of time. Transaction management module 30 may attempt to initiate another transaction to the same proxy server, i.e., proxy server 20A, when timeout counter 34 is less than a threshold and the transaction that experienced the transaction timeout is a non-register transaction. In other words, transaction management module 30 may attempt to send at least one more message to the same proxy server before registering via a new proxy server. Transaction management module 30 may continue to attempt to send messages to proxy server 20A until expiration of the particular time period, e.g., experiencing a threshold number of consecutive transaction timeouts, expiration of failure duration timer 36 or a transaction timeout occurs for register transaction.

After the transaction timeout, transaction management module 30 increments timeout counter 34 stored within memory 28. Timeout counter 34 tracks the number of transaction timeouts that are experienced by non-register transactions. When timeout counter 34 exceeds a threshold number of transaction timeouts transaction management module 30 cancels the current communication sessions and notifies applications 32 that the communication sessions have been cancelled. Alternatively, or additionally, transaction management module 30 may cancel the current communication sessions upon expiration of failure duration timer 36. Failure duration timer 36 tracks the amount of time that has elapsed since experiencing the first transaction timeout. Failure duration timer 36 is used to keep the current communication sessions open for a particular period of time after experiencing the first transaction. Failure duration timer 36 is independent of the number of transaction timeouts that occur after the initial transaction timeout.

Applications 32 release current resources and drop dialogs upon receiving the notification from transaction management module 30 that the communication sessions were cancelled. One of applications 32 in conjunction with transaction management module 30 performs initial registration with the new proxy server 20. Transaction management module 30 also resets timeout counter 34 and/or failure duration timer 36. Being able to initiate one or more subsequent non-register transactions after a transaction timeout may enable transaction management module 30 to avoid unnecessary disruption to ongoing communication sessions when the cause of the transaction timeout is temporary. Transaction management module 30, however, determines that the proxy server is unreachable if several successive transaction timeouts are experienced.

In certain circumstances, transaction management module 30 may cancel the current communication sessions and register via a new proxy server when no transaction timeout occurs. For example, transaction management module 30 may cancel the current communication sessions and register via a new proxy server after detecting a terminal IPsec failure event. The deletion of a security association at either communication device or proxy, an outgoing message that does not match a security association, or detection of an unreachable proxy are examples of terminal IPsec error events that trigger an initial registration procedure.

The various components illustrated in FIG. 2 may be realized in hardware, software, firmware, or any combination thereof. Some components may be realized as processes or modules executed by one or more microprocessors or digital signal processors (DSPs), one or more application specific integrated circuits (ASICs), one or more field programmable gate arrays (FPGAs), or other equivalent integrated or discrete logic circuitry. Depiction of different features as modules is intended to highlight different functional aspects of communication device 14A and does not necessarily imply that such modules must be realized by separate hardware and/or software components. Rather, functionality associated with one or more modules may be integrated within common or separate hardware and/or software components. Thus, the disclosure should not be limited to the example of communication device 14A.

When implemented in software, the functionality ascribed to the systems and devices described in this disclosure may be embodied as instructions on a computer-readable medium, such as within memory 34, which may comprise, for example, random access memory (RAM), read-only memory (ROM), non-volatile random access memory (NVRAM), electrically erasable programmable read-only memory (EE- PROM), FLASH memory, or the like. The instructions are executed to support one or more aspects of the functionality described in this disclosure.

Figure 3:
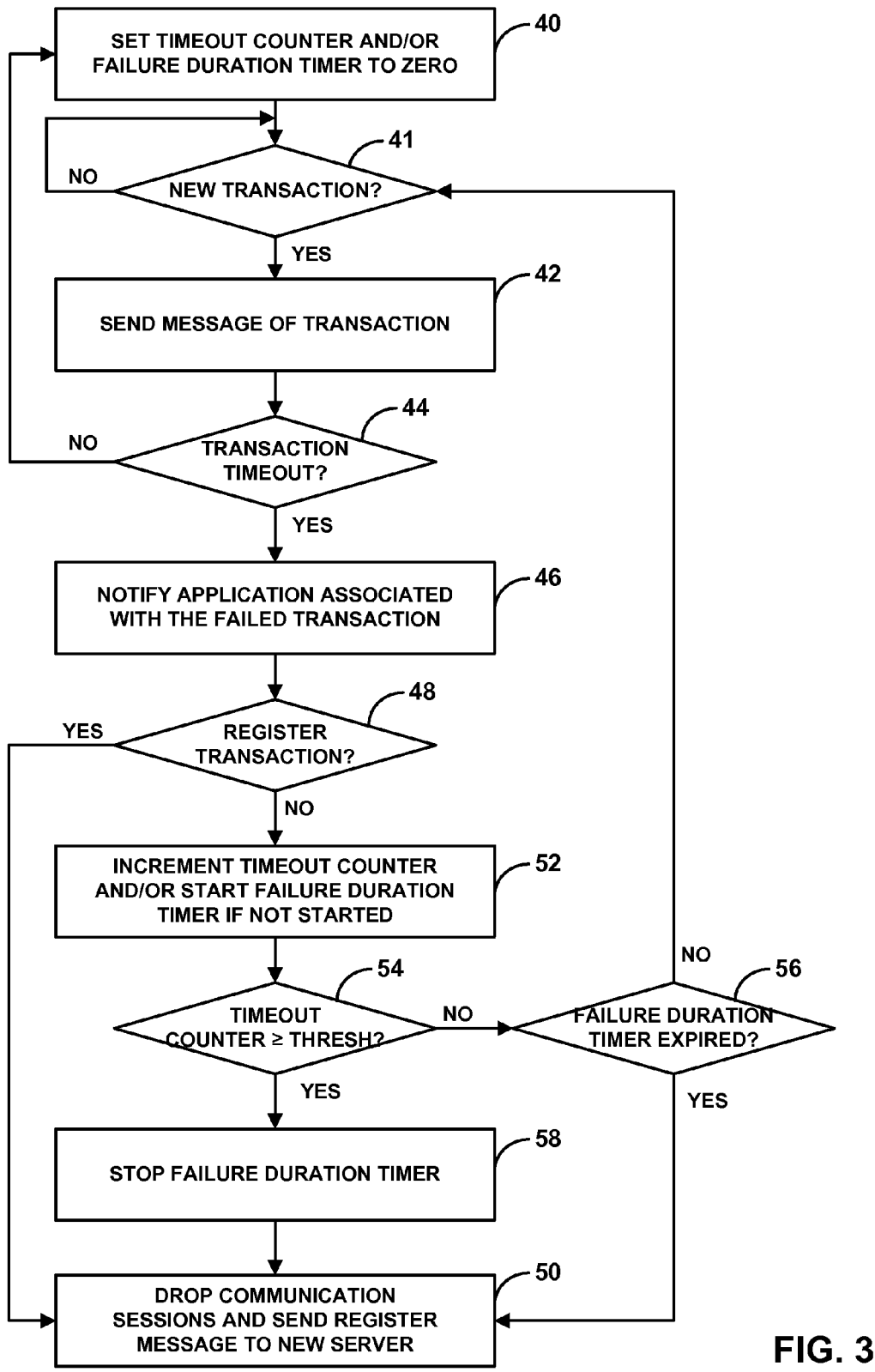
FIG. 3 is a flow diagram illustrating exemplary operation of a communication device handling transaction timeouts in accordance with the techniques of this disclosure.

FIG. 3 is a flow diagram illustrating exemplary operation of a communication device, such as communication device 14A, handling transaction timeouts in accordance with the techniques of this disclosure. Transaction management module 30 sets timeout counter 34 and/or failure duration timer 36 equal to zero (40). This indicates that no transactions have experienced transaction timeouts. Transaction management module 30 may set timeout counter 34 and/or failure duration timer 36 to zero after a transaction successfully completes, i.e., does not experience a timeout. Alternatively, transaction management module 30 may set timeout counter 34 and/or failure duration timer 36 to zero when a new registration is completed with a new proxy server 20.

Transaction management module waits for a new transaction (41). When there is no new transaction, transaction management continues to wait for a new transaction. When there is a new transaction, transaction management module 30 sends a message of a new transaction to the corresponding proxy server 20 (42). Sending the message involves not only sending the initial message, but also sending any retransmissions of the message in accordance with a retransmission schedule. As described above, transaction management module 30 and/or applications 32 may send the message and/or retransmissions of the message using different compression techniques based on the value of timeout counter 34. When timeout counter 34 is equal to zero, for example, transaction management module 30 may transmit the initial message and at least a portion of the retransmissions of the message compressed using state information. When timeout counter 34 is greater than zero, however, transaction management module 30 may transmit the initial message of the transaction and/or retransmissions of the message compressed using bytecode and without state information. Additionally, transaction management module 30 may select particular compression techniques for the message and/or retransmissions of the message based on the underlying transport layer protocol.

Moreover, as described above in detail, transaction management module 30 may include a mechanism for detecting decompression failure as well as the cause of decompression failure, such as the NACK. In these cases, transaction management module 30 may modify the compression technique used to for retransmission of subsequent versions of the message based on the cause of the decompression failure. In other aspects, transaction management module 30 may use ICMP error messages to abort further retransmissions of the message and treat the receipt of this error message like a transaction timeout of a register request.

Transaction management module 30 determines whether the transaction experiences a transaction timeout (44). Transaction management module 30 determines the transaction experienced a transaction timeout when no reply is received from the corresponding proxy server 20 in response to the initial message or any retransmissions of the message within a particular amount of time, e.g., within the transaction timeout timer values specified above. The transaction timeout timer values may vary based on the type of message. In SIP, for example, a transaction timeout timer values may be equal to 64 times the round trip time (RTT). Usually the transaction timeout timer value is 32 seconds since RTT is assumed to be 0.5 seconds.

When a reply is received from the proxy server (i.e., no transaction timeout occurs), transaction management module 30 sets timeout counter 34 and/or failure duration timer 36 equal to zero. When no reply is received from the corresponding proxy server within the transaction timeout timer value (i.e., a transaction timeout occurs), transaction management module 30 notifies the one of applications 32 associated with the failed transaction (46). The associated application 32 handles the transaction timeout for that particular message. Tables 3 and 4 illustrate examples of applications 32 handling transaction timeouts for particular types of transactions.

Transaction management module 30 determines whether the transaction that experienced the transaction timeout was a register transaction (48). A register transaction may include initial registration transactions, re-registration transactions or de-registration transactions. When the transaction that experienced the transaction timeout is a register transaction, transaction management module 30 drops any current communication sessions and sends an initial registration message to a new proxy server 20 (50).

When the transaction that experienced the transaction timeout is a non-register transaction, transaction management module 30 increments timeout counter 34 and starts failure duration timer 36 if it is not yet started (52). Transaction management module 30 compares the value of timeout counter 34 to a threshold (54). When timeout counter 34 is greater than or equal to the threshold, transaction management module 30 stops failure duration timer 36 (58). Transaction management module 30 drops any current communication sessions and sends an initial registration message to a new proxy server 20 (50).

When timeout counter 34 is less than the threshold, transaction management module 30 may determine whether failure duration timer 36 has expired (56). When failure duration timer 36 has not expired, transaction management module may wait for a new transaction, i.e., subsequent transaction, and send a subsequent message to the corresponding proxy server when detecting a new transaction (41, 42). In other words, transaction management module 30 does not immediately drop the communication session and register with a new one of proxy servers 20.

When failure duration timer 36 has expired, transaction management module 30 drops any current communication sessions and sends an initial registration message to a new proxy server 20 (50). Being able to send one or more subsequent messages to the same proxy server after a transaction timeout experienced by a non-register transaction enables transaction management module 30 to avoid unnecessary disruption to ongoing communication sessions when the cause of the transaction timeout is temporary. Transaction management module 30 assumes that the proxy server is unreachable if several successive transaction timeouts are experienced.

In the example described in FIG. 3, transaction management module 30 uses both timeout counter 34 and failure duration timer 36 in conjunction with one another. However, either of these may be statically or dynamically adjusted based on the type of transaction timeout. For example, failure duration timer 36 may be adjusted to be reached more quickly in some circumstances to reduce the number of incoming calls that may be lost during subsequent attempted transactions. However, in other aspects, transaction management module 30 may utilize only one of timeout counter 34 and failure duration timer 36 independently of the other. In other words, transaction management module 30 may determine whether to drop the communications sessions based on a comparison of the timeout counter 34 with the threshold without regard to failure duration timer 36. Likewise, transaction management module 30 may determine whether to drop the communications sessions based on whether failure duration timer 36 has expired without regard to timeout counter 34.

Figure 4:
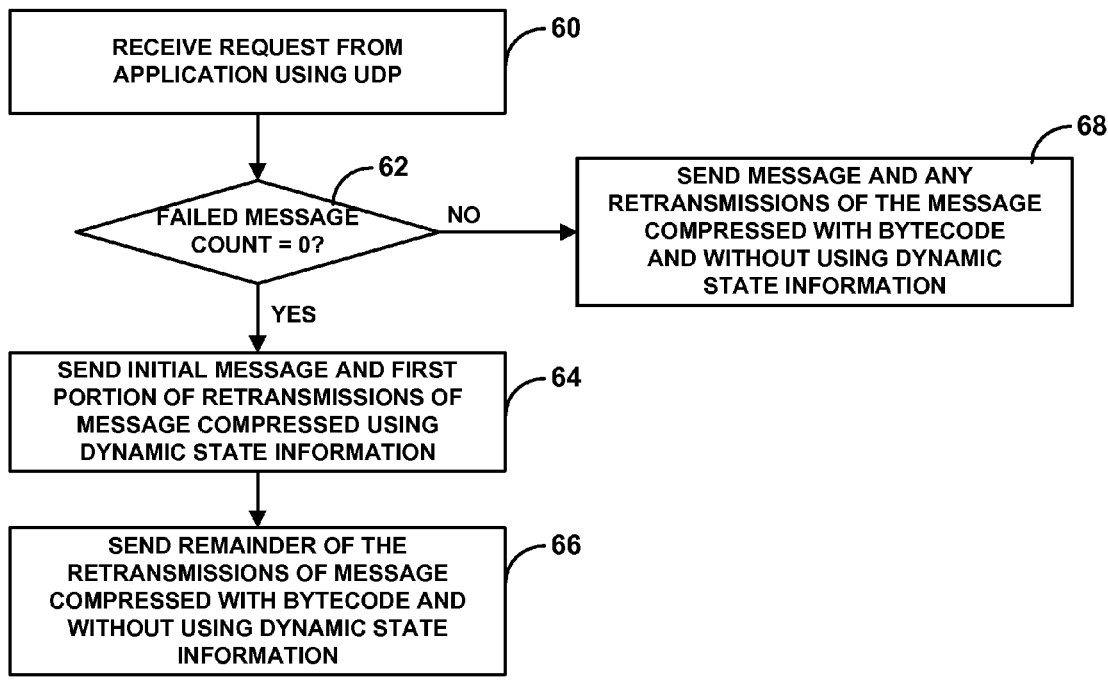
FIG. 4 is a flow diagram illustrating exemplary operation of a transaction management module sending a message and retransmissions of the message to a proxy server in accordance with a retransmission schedule when using UDP as an underlying transport layer protocol.

FIG. 4 is a flow diagram illustrating exemplary operation of transaction management module 30 sending a message and, if necessary, retransmissions of the message to a proxy server in accordance with a retransmission schedule. Initially, transaction management module 30 receives a request from one of applications 32 using UDP (60). Transaction management module 30 determines whether the value of timeout counter 34 is equal to zero (62).

When the timeout counter 34 is equal to zero, transaction management module 30 sends the initial message and a first portion of the retransmissions of the message compressed using dynamic state information (64). The first portion of the retransmissions of the message may, for example, include the first two or three retransmissions of the message. If no reply is received after the first few transmissions of the message, transaction management module 30 sends the remainder of the retransmissions of the message compressed with bytecode and without using dynamic state information (66).

When the timeout counter 34 is greater than zero, transaction management module 30 sends the initial transmission of the message and any retransmissions of the message compressed with bytecode and without using dynamic state information (68). In this manner, transaction management module 30 reduces the risk of experiencing a decompression failure after a transaction timeout has already occurred.

Figure 5:
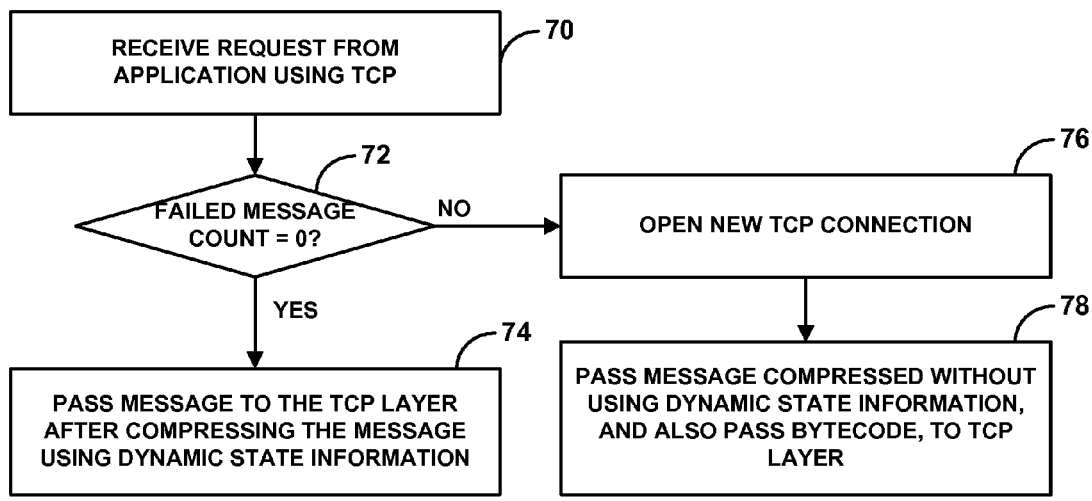
FIG. 5 is a flow diagram illustrating exemplary operation of a transaction management module sending a message and retransmissions of the message to a proxy server in accordance with a retransmission schedule when using TCP as an underlying transport layer protocol.

FIG. 5 is a flow diagram sending a message and, if necessary, retransmissions of the message to a proxy server in accordance with a retransmission schedule. Initially, transaction management module 30 receives a request from one of applications 32 using TCP (70). Transaction management module 30 determines whether the value of timeout counter 34 is equal to zero (72). When operating the value of timeout counter 34 is equal to zero, transaction management module 30 passes the message to the TCP layer after compressing it using existing dynamic state information (74). TCP is responsible for ensuring reliable delivery of the message to the proxy.

When the timeout counter 34 is greater than zero, opens a new TCP connection (76). In one aspect, transaction management module 30 may open the new TCP connection between the communication device and the proxy server using the same port number. Transaction management module 30 passes the message along with the bytecode to the TCP layer after compressing the message without using the dynamic state information (78). Again, TCP is responsible for ensuring reliable delivery of the message to the proxy.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

The invention claimed is:

1. A method comprising:
  detecting a transaction timeout for first signaling and control transaction upon not receiving a reply message from a first device;
  incrementing a timeout counter upon detecting the transaction timeout;
  comparing the timeout counter to a threshold value, wherein the threshold value is dynamically determined based on call arrival statistics;
  determining whether the first signaling and control transaction is a register signaling and control transaction or a non-register signaling and control transaction;
  upon determining that the first signaling and control transaction is a non-register signaling and control transaction:
    a) initiating at least one subsequent non-register signaling and control transaction with the first device for a particular period of time after detecting the transaction timeout; and
    b) initiating a second signaling and control transaction with a second device after the particular period of time when no reply message is received for the at least one subsequent non-register signaling and control transaction; and
  upon determining that the first signaling and control transaction is a register signaling and control transaction, initiating a subsequent register signaling and control transaction with the second device without sending the subsequent register signaling and control transaction to the first device.

2. The method of claim 1,
  wherein initiating the at least one subsequent non-register signaling and control transaction comprises initiating the at least one subsequent non-register signaling and control transaction when a value of the timeout counter is less than the threshold value.

3. The method of claim 2, further comprising:
  receiving a reply message for the at least one subsequent non-register signaling and control transaction; and
  resetting the timeout counter upon receiving the reply message.

4. The method of claim 1,
  wherein initiating the second signaling and control transaction comprises initiating the second signaling and control transaction message with the second device when a value of the timeout counter is greater than or equal to the threshold value.

5. The method of claim 1, further comprising:
initiating a timer upon detecting the transaction timeout for the first signaling and control transaction,
wherein initiating the second signaling and control transaction comprises initiating the second signaling and control transaction with the second device upon expiration of the timer.

6. The method of claim 1, wherein initiating the at least one subsequent non-register signaling and control transaction comprises sending an initial message for the subsequent non-register signaling and control transaction and one or more retransmissions of the message according to a retransmission schedule.

7. The method of claim 6, wherein sending the initial message and the one or more retransmissions of the message comprises sending the initial message of the subsequent non-register signaling and control transaction and the one or more retransmissions of the message compressed with bytecode and without dynamic state information when there has been at least one transaction timeout.

8. The method of claim 1, further comprising sending an initial message for the subsequent non-register signaling and control transaction and one or more retransmissions of the message, wherein the initial message for the non-register signaling and control transaction and a first portion of the retransmissions of the message are sent using a first compression technique and a second portion of the retransmissions of the message are sent using a second compression technique.

9. The method of claim 8, wherein the second portion of the retransmissions of the message are sent using no compression.

10. The method of claim 8, wherein the initial message for the subsequent non-register signaling and control transaction and the first portion of the retransmissions of the message are sent compressed using dynamic state information and the second portion of the retransmissions of the message are sent compressed without using dynamic state information.

11. The method of claim 8, further comprising:
detecting a decompression failure;
identifying a cause of the detected decompression failure; and
selecting the second compression technique for the second portion of the retransmissions based on the cause of the decompression failure.

12. The method of claim 8, further comprising:
receiving an Internet Control Message Protocol (ICMP) error message
aborting further retransmissions of the message upon receiving the ICMP error message;
initiating the second signaling and control transaction message with the second device.

13. The method of claim 1, further comprising:
detecting a terminal Internet Protocol Security (IPsec) failure event; and
initiating the second signaling and control transaction message with the second device in response to detecting the IPsec failure event.

14. The method of claim 1, wherein detecting the transaction timeout comprises detecting the transaction timeout upon not receiving a reply message for the non-register first signaling and control transaction from the first device before expiration of a transaction timeout timer.

15. An apparatus comprising:
transmit circuitry to transmit signals; and
a transaction management module that:
detects a transaction timeout for a first signaling and control transaction upon not receiving a reply message from a first device;
increments a timeout counter upon detecting the transaction timeout for the first signaling and control transaction;
compares the timeout counter to a threshold value, wherein the threshold value is dynamically determined based on call arrival statistics;
determines whether the first signaling and control transaction is a register signaling and control transaction or a non-register signaling and control transaction;
upon determining that the first signaling and control transaction is a non-register signaling and control transaction:
(a) initiates, via the transmit circuitry, at least one subsequent non-register signaling and control transaction with the first device for a particular period of time after detecting the transaction timeout for the first signaling and control transaction, and
(b) initiates, via the transmit circuitry, a second signaling and control transaction with a second device after the particular period of time when no reply message is received for the at least one subsequent non-register signaling and control transaction; and
upon determining that the first signaling and control transaction is a register signaling and control transaction, initiates a subsequent register signaling and control transaction with the second device without sending the subsequent register signaling and control transaction to the first device.

16. The apparatus of claim 15, further comprising:
a timeout counter that tracks a number of transaction timeouts, wherein the transaction management module initiates the at least one subsequent non-register signaling and control transaction when a value of the timeout counter is less than the threshold value.

17. The apparatus of claim 16, wherein the transaction management module receives a reply message for the at least one subsequent non-register signaling and control transaction and resets the timeout counter upon receiving the reply message.

18. The apparatus of claim 15, further comprising:
a timeout counter that tracks a number of transaction timeouts, wherein the transaction management module initiates the second signaling and control transaction with the second device when a value of the timeout counter is greater than or equal to the threshold value.

19. The apparatus of claim 15, further comprising a timer that tracks the amount of time that has elapsed since the transaction timeout for the first signaling and control transaction, wherein the transaction management module initiates the second signaling and control transaction with the second device upon expiration of the timer.

20. The apparatus of claim 15, wherein the transaction management module sends an initial message for the subsequent non-register signaling and control transaction and one or more retransmissions of the message according to a retransmission schedule.

21. The apparatus of claim 20, wherein the transaction management module sends the initial message of the subsequent non-register signaling and control transaction and the one or more retransmissions of the message compressed with bytecode and without dynamic state information when there has been at least one transaction timeout.

22. The apparatus of claim 15, wherein the transaction management module sends an initial message for the subsequent non-register signaling and control transaction and one or more retransmissions of the message, wherein the initial message and a first portion of the retransmissions of the message are sent using a first compression technique and a second portion of the retransmissions of the message are sent using a second compression technique.

23. The apparatus of claim 22, wherein the second compression technique comprises no compression.

24. The apparatus of claim 22, wherein the initial message for the subsequent non-register signaling and control transaction and the first portion of the retransmissions of the message are sent compressed using dynamic state information and the second portion of the retransmissions of the message are sent compressed without using dynamic state information.

25. The apparatus of claim 22, wherein the transaction management module detects a decompression failure, identifies a cause of the detected decompression failure, and selects the second compression technique for the second portion of the retransmissions based on the cause of the decompression failure.

26. The apparatus of claim 22, wherein the transaction management module receives an Internet Control Message Protocol (ICMP) error message, aborts further retransmissions of the message upon receiving the ICMP error message, and initiates the second signaling and control transaction message with the second device.

27. The apparatus of claim 15, wherein the transaction management module detects the transaction timeout upon not receiving a reply message for the non-register signaling and control transaction from the first device before expiration of a transaction timeout timer.

28. The apparatus of claim 15, wherein the transaction management module detects a terminal Internet Protocol Security (IPsec) failure event and initiates the register signaling and control transaction message with the second device in response to detecting the IPsec failure event.

29. A computer-program product comprising a non-transitory computer readable medium having instructions thereon, the instructions comprising:
 code for detecting a transaction timeout for a first signaling and control transaction upon not receiving a reply message from a first device;
 code for incrementing a timeout counter upon detecting the transaction timeout;
 code for comparing the timeout counter to a threshold value, wherein the threshold value is dynamically determined based on call arrival statistics;
 code for determining whether the first signaling and control transaction is a register signaling and control transaction or a non-register signaling and control transaction;
 code for, upon determining that the first signaling and control transaction is a non-register signaling and control transaction,
  a) initiating at least one subsequent non-register signaling and control transaction with the first device for a particular period of time after detecting the transaction timeout for the first transaction; and
  b) initiating a second signaling and control transaction with a second device after the particular period of time when no reply message is received for the at least one subsequent non-register signaling and control transaction; and
 code for, upon determining that the first signaling and control transaction is a register signaling and control transaction, initiating a subsequent register signaling and control transaction with the second device without sending the subsequent register signaling and control transaction to the first device.

30. The computer-program product of claim 29,
 wherein code for initiating the at least one subsequent non-register signaling and control transaction comprises code for initiating the at least one subsequent non-register signaling and control transaction when a value of the timeout counter is less than the threshold value.

31. The computer-program product of claim 30, further comprising:
 code for receiving a reply message for the at least one subsequent non-register signaling and control transaction; and
 code for resetting the timeout counter upon receiving the reply message.

32. The computer-program product of claim 29,
 wherein code for initiating the second signaling and control transaction comprises code for initiating the register signaling and control transaction message with the second device when the value of the timeout counter is greater than or equal to the threshold value.

33. The computer-program product of claim 29, further comprising:
 code for initiating a timer upon detecting the transaction timeout for the first signaling and control transaction,
 wherein code for initiating the second signaling and control transaction comprises code for initiating the second signaling and control transaction with the second device upon expiration of the timer.

34. The computer-program product of claim 29, wherein code for initiating the at least one subsequent non-register signaling and control transaction comprises code for sending an initial message for the subsequent non-register signaling and control transaction and one or more retransmissions of the message according to a retransmission schedule.

35. The computer-program product of claim 34, wherein code for sending the initial message and the one or more retransmissions of the message comprises code for sending the initial message of the subsequent non-register signaling and control transaction and the one or more retransmissions of the message compressed with bytecode and without dynamic state information when there has been at least one transaction timeout.

36. The computer-program product of claim 29, further comprising code for sending an initial message for the subsequent non-register signaling and control transaction and one or more retransmissions of the message, wherein the initial message for the non-register signaling and control transaction and a first portion of the retransmissions of the message are sent using a first compression technique and a second portion of the retransmissions of the message are sent using a second compression technique.

37. The computer-program product of claim 36, wherein the second portion of the retransmissions of the message are sent using no compression.

38. The computer-program product of claim 36, wherein the initial message for the subsequent non-register signaling and control transaction and the first portion of the retransmissions of the message are sent compressed using dynamic state information and the second portion of the retransmissions of the message are sent compressed without using dynamic state information.

39. The computer-program product of claim 36, further comprising:
   code for detecting a decompression failure;
   code for identifying a cause of the detected decompression failure; and
   code for selecting the second compression technique for the second portion of the retransmissions based on the cause of the decompression failure.

40. The computer-program product of claim 36, further comprising:
   code for receiving an Internet Control Message Protocol (ICMP) error message
   code for aborting further retransmissions of the message upon receiving the ICMP error message; and
   code for initiating the second signaling and control transaction message with the second device.

41. The computer-program product of claim 29, wherein code for detecting the transaction timeout comprises code for detecting the transaction timeout upon not receiving a reply message for the first signaling and control transaction from the first device before expiration of a transaction timeout timer.

42. The computer-program product of claim 29, further comprising:
   code for detecting a terminal Internet Protocol Security (IPsec) failure event; and
   code for initiating the second signaling and control transaction message with the second device in response to detecting the IPsec failure event.

43. An apparatus comprising:
   means for detecting a transaction timeout for a first signaling and control transaction upon not receiving a reply message from a first device;
   means for incrementing a timeout counter upon detecting the transaction timeout;
   means for comparing the timeout counter to a threshold value, wherein the threshold value is dynamically determined based on call arrival statistics;
   means for determining whether the first signaling and control transaction is a register signaling and control transaction or a non-register signaling and control transaction;
   means for, upon determining that the first signaling and control transaction is a non-register signaling and control transaction, initiating at least one subsequent non-register signaling and control transaction with the first device for a particular period of time after detecting the transaction timeout for the first signaling and control transaction, wherein the initiating means initiates a second signaling and control transaction with a second device after the particular period of time when no reply message is received for the at least one subsequent non-register signaling and control transaction; and
   means for, upon determining that the first signaling and control transaction is a register signaling and control transaction, initiating a subsequent register signaling and control transaction with the second device without sending the subsequent register signaling and control transaction to the first device.

44. The apparatus of claim 43,
   wherein the initiating means initiates the at least one subsequent non-register signaling and control transaction when the value of the timeout counter is less than the threshold value.

45. The apparatus of claim 44, further comprising:
   means for receiving a reply message for the at least one subsequent non-register signaling and control transaction; and
   means for resetting the timeout counter upon receiving the reply message.

46. The apparatus of claim 43,
   wherein the initiating means initiates the second signaling and control transaction with the second device when the value of the timeout counter is greater than or equal to the threshold value.

47. The apparatus of claim 43, further comprising:
   means for initiating a timer upon detecting the transaction timeout for the first signaling and control transaction, wherein the initiating means initiates the second signaling and control transaction with the second device upon expiration of the timer.

48. The apparatus of claim 43, wherein the initiating means initiates an initial message for the subsequent non-register signaling and control transaction and one or more retransmissions of the message according to a retransmission schedule.

49. The apparatus of claim 48, wherein the initiating means initiates the initial message for the subsequent non-register signaling and control transaction and the one or more retransmissions of the message compressed with bytecode and without dynamic state information when there has been at least one transaction timeout.

50. The apparatus of claim 43, wherein the initiating means initiates an initial message for the subsequent non-register signaling and control transaction and one or more retransmissions of the message, wherein initial message for the subsequent non-register signaling and control transaction and a first portion of the retransmissions of the message are sent using a first compression technique and a second portion of the retransmissions of the message are sent using a second compression technique.

51. The apparatus of claim 50, wherein the second compression technique comprises no compression.

52. The apparatus of claim 50, wherein the initial message of the subsequent non-register signaling and control transaction and the first portion of the retransmissions of the message are sent compressed using dynamic state information and the second portion of the retransmissions of the message are sent compressed without using dynamic state information.

53. The apparatus of claim 50, further comprising:
   means for detecting a decompression failure and identifying a cause of the detected decompression failure; and
   means for selecting the second compression technique for the second portion of the retransmissions based on the cause of the decompression failure.

54. The apparatus of claim 50, wherein the initiating means receives an Internet Control Message Protocol (ICMP) error message, aborts further retransmissions of the message upon receiving the ICMP error message, and initiates the second signaling and control transaction message with the second device.

55. The apparatus of claim 43, wherein the detecting means detects the transaction timeout upon not receiving a reply message for the first signaling and control transaction from the first device before expiration of a transaction timeout timer.

56. The apparatus of claim 43, further comprising:
   means for detecting a terminal Internet Protocol Security (IPsec) failure event; and wherein the initiating means initiates the second signaling and control transaction message with the second device in response to detecting the IPsec failure event.

* * * * *